Figure 1:
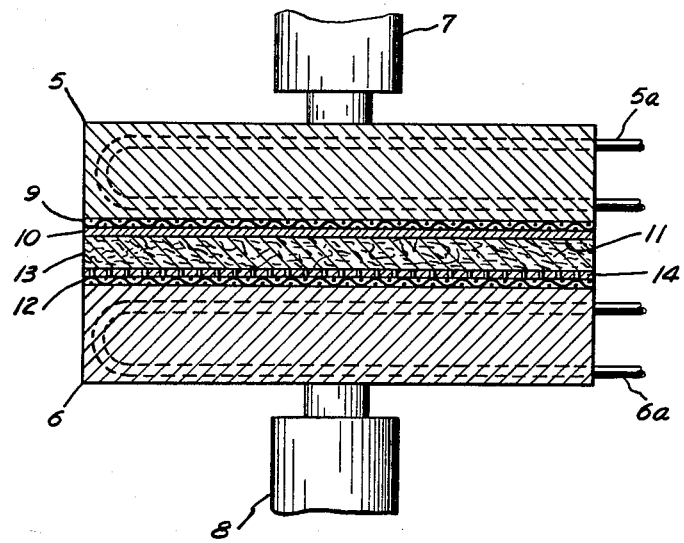

Nov. 26, 1963    L. N. EGERSTRAND    3,112,243
METHOD AND APPARATUS FOR MAKING HARDBOARD
Filed Sept. 18, 1961

INVENTOR.
LENNART N. EGERSTRAND
BY Everett J. Schroeder
Kenneth D. Siegfried
ATTORNEYS United States Patent Office 3,112,243
Patented Nov. 26, 1963

3,112,243
METHOD AND APPARATUS FOR
MAKING HARDBOARD
Lennart N. Egerstrand, Duluth, Minn., assignor to Superwood Corporation, Duluth, Minn., a corporation of Minnesota
Filed Sept. 18, 1961, Ser. No. 138,988
5 Claims. (Cl. 162—225)

This invention relates to the manufacture of hardboard. More particularly, it relates to novel and improved methods of manufacturing hardboard and apparatus therefor.

Modern and conventional methods and apparatus used in the manufacture of hardboard today vary in accordance with the strength required in the board, with adhesive and binders being included in the raw materials where maximum strength is necessary. Regardless of the raw materials utilized, the resultant board always has at least one rough surface wherever a wetlap raw material is utilized. This is true because a wire screen is utilized at one side of the wetlap in order to permit the escape of the moisture or steam which is generated by the simultaneous heating and compression of the wetlap. Such a screen has been used for many years in the production of hardboard despite the fact that there are serious handicaps and undesirable results involved. For example, I have found that a board which is manufactured in the conventional manner does not have maximum strength and will absorb moisture more readily than is desirable and is not sufficiently elastic to meet the demands of the trade in the most satisfactory manner. Moreover, in order to produce a board having both sides smooth, it is necessary to sand off the rough surface. Such sanding operations are costly because of loss of time and fiber and the resultant board is much weaker than desired. In addition, the hardboard formation time is excessive and the cleaning and general maintenance of the equipment, such as the requisite cleaning of the screen, is costly and time consuming. As a result, the cost of the end product is unduly high and its quality is impaired or, at least, not as high as desired. My invention is directed toward overcoming these undesirable characteristics in a simple and inexpensive manner.

It is a general object of my invention to provide novel and improved methods and apparatus for manufacturing hardboard which are simple and inexpensive in construction and operation.

A more specific object is to provide a novel and improved method and apparatus for manufacturing hardboard which may be used to produce hardboard commercially in an economical manner, the hardboard having more desirable physical characteristics than has heretofore been commercially feasible through the practice of established methods and the use of conventional apparatus.

Another object is to provide novel and improved methods and apparatus for manufacturing hardboard which when utilized produce hardboard having greater elasticity, greater internal bond strength, and greater resistance to absorption of water and consequent swelling.

Another object is to provide a novel and improved method and apparatus for producing hardboard which will reduce the amount of time required to complete the manufacture of the hardboard and hence increase the rate of manufacture and reduce the cost of manufacture per unit.

Another object is to provide a novel and improved method and apparatus for manufacturing hardboard which eliminates time consuming, and hence costly, maintenance operations required in the use of conventional methods and apparatus.

Another object is to provide a novel and improved method and apparatus for manufacturing hardboard which will facilitate the drainage of the wetlap and control the rate thereof to make it substantially uniform across the entire area thereof with consequent improvement in the physical characteristics of the end product.

Another object is to provide a novel and improved method and apparatus for manufacturing hardboard which will produce hardboard entirely smooth on one side and having only minor and relatively few projections which may be quickly, readily and easily removed from the other side to provide an end product which is completely smooth on both sides and having greater strength and elasticity and resistance to absorption of water than hardboard manufactured under the conventional method.

Another object is to provide a novel and improved method and apparatus for manufacturing hardboard from wetlap which will produce at a reduced cost a hardboard having improved physical characteristics and yet can be manufactured with beautiful designs imprinted upon one or both sides thereof.

Another object is to provide a novel and improved method and apparatus for manufacturing hardboard which will produce extremely strong hardboard without need for adding expensive adhesives or binders to the wetlap material and can utilize relatively coarse fibers therein.

Another object is to provide novel and improved methods and apparatus for manufacturing hardboard which will substantially increase the area of the product which is subjected to maximum pressures and hence substantially increase the density and strength of the resultant board.

Another object is to provide a novel and improved method and apparatus for manufacturing hardboard which will require a shorter press cycle and permit the use of higher temperatures in the manufacturing operation and consequently produce a stronger and more elastic board.

Figure 2:
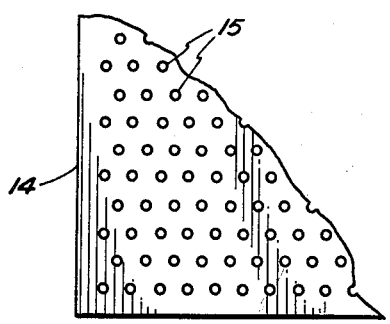

These and other objects and advantages of this invention will more fully appear from the following description, made in connection with the accompanying drawings, wherein like reference characters refer to the same or similar parts throughout the several views, and in which:

FIG. 1 is a diagrammatic view in section illustrating the method and apparatus utilized in practicing my invention; and FIG. 2 is a fragmentary front elevation of the perforated plate which I utilize as part of a drainage package to produce an improved hardboard.

FIG. 1 illustrates diagrammatically one section of a conventional hardboard manufacturing apparatus which includes a pair of platens which have been designated by the numerals 5 and 6 and are heated by steam under pressure which is introduced and circulated through the platens by steam lines which for the sake of convenience have been indicated by the numerals 5a and 6a. Such platens are normally utilized conventionally in a plurality of assemblies and have pressure applied thereto from opposite directions by hydraulic or other means which have been diagrammatically represented and indicated by the numerals 7 and 8. The platen 5 is shown in FIG. 1 as having the conventional screen 9 disposed between the main body of the platen and its stainless steel plate 10. The function of the screen 9 is to distribute the heat uniformly throughout the plate 10 so that its smooth surface 11 which is disposed opposite to and faces the face of the platen 6 will produce a board having a completely smooth surface.

In the conventional method and apparatus for manufacturing hardboard the platens 6 carry a screen 12 which supports the wetlap layer 13 and facilitates drainage thereof while the layer is compressed between the two platens. It is the screen 12 which causes the rough surface upon one side of hardboard which is manufactured in the conventional manner. Such a screen, however, since the fibers of the layer of wet pulp are in direct contact therewith in the conventional manufacture of hardboard succeeds in properly draining only the more peripheral portions of the layer of wetlap while the more central portions have the steam generated therein trapped. As the result the cooking time is limited for scorching will soon appear in the more central portions of the board if the high pressures are maintained and consequently in the conventional method, the pressure must be reduced while the board is dried and then returned to full pressure for several minutes. Even then the resultant board does not have the desired strength and elasticity. I have found that by superimposing a perforated plate 14 which has smooth upper and bottom surfaces upon the screen 12 and beneath the layer 13, a hardboard is formed having much more desirable physical characteristics and the time cycle required for manufacture can be reduced.

The plate 14 is preferably formed of stainless steel, but mild steel will suffice, and is provided with a plurality of vertically extending openings 15 which constitute drainage apertures when the plate is used as shown. These apertures are relatively widely spaced as compared to the apertures or openings of the screen 12 and range preferably in diameter from one-sixteenth inches to one-tenth inch while the distance from center to center ranges preferably from three-sixteenths inch to nine thirty-seconds of an inch. The size of the apertures and the center to center spacing thereof and the arrangement thereof varies in accordance with the thickness of the board to be manufactured. These apertures 15 are preferably arranged in staggered relation as shown in FIG. 2.

The optimum pressures utilized upon the platens 5 and 6 are 750–1000 p.s.i. and the optimum temperatures are 360–380 degrees Fahrenheit. The total cycle time involved depends, of course, upon the thickness of the board to be manufactured but for one-eight inch board, for example, the total time when utilizing my invention ranges from six and three-fourths to seven minutes. In utilizing my invention the screen 12 and the plate 14 constitute a drainage package which supports the wetlap or layer of wet wood pulp 13 while the latter is being compressed under desired temperatures. The following designs have proved successful in the manufacture of one-eighth inch hardboard with the preferred plate using apertures 15 of one-sixteenth inch and spaced from center to center at seven thirty-seconds of an inch and in staggered relation.

| Hole Diameter | Staggered | Distance Center to Center |
|---|---|---|
| 1/16 | Yes | 7/32 |
| 1/16 | No | 3/16 |
| 1/12 | Yes | 9/32 |

In the manufacture of a one-fourth inch board the volume of moisture to be drained is greater and consequently a plate 14 having the openings and center to center distances and relationship shown have been utilized successfully.

| Hole Diameter | Staggered | Distance Center to Center |
|---|---|---|
| 1/12 | Yes | 7/32 |
| 1/12 | No | 3/16 |

From the above it can be seen that I control the flow of the steam as it is generated in layer 13 of wetlap by varying the diameter of the apertures 15 and the distance thereof from center to center. Calculations with respect to the above-mentioned apertures, openings or holes 15 will show that the combined area of the said apertures, openings or holes ranges between 4.35% and 16.7% of the total area of the plate 14. The preferred means of varying appears to be by varying the distance from center to center and, of course, a relatively thick board requires shorter center to center distances because more moisture needs to escape. Apertures 15 may be made of larger diameters to accomplish this purpose but the preferred means is to vary the distance from center to center of the perforations. In either event or in utilization of both methods simultaneously, it will be seen that the function of these variations is to control the drainage of moisture from the layer 13 of wetlap so that it will be uniform across the entire area thereof. As compared to the screen 12, it will be readily appreciated that the areas between the apertures 15 are relatively great and hence support the fibers of the layer 13 more adequately so that maximum pressure is applied to the major portion of the board while the steam which is generated escapes through the apertures 15 and very readily outwardly laterally through the screen 12. Through the use of this arrangement the escape of the steam from the central portions of the layer 13 of wetlap is greatly facilitated and, in fact, the escape of steam throughout the area of the board is at uniform rate thereby making it possible to utilize maximum pressures and to reduce the amount of time required for producing the board. This can best be seen by comparison of the old method of manufacturing hardboard from wetlap without the addition of adhesives as compared to the operational figures when utilizing my method and apparatus.

Outlined below are the operational figures involved in making one-eighth inch board by the conventional methods heretofore known. These figures illustrate the normal press cycle of the operation.

|  | Minutes |
|---|---|
| (1) Going to full pressure | 1 |
| (2) Staying at full pressure (750–1000 p.s.i.) | 1–1¼ |
| (3) Breathing at 80–100 p.s.i. | 3–3½ |
| (4) Back to full pressure and remaining thereat | 1–2 |
| Total | 7–8 |

When utilizing my apparatus and methods the following illustrates the full normal press cycle.

|  | Minutes |
|---|---|
| (1) Going up to pressure | 1 |
| (2) Staying at full pressure (compressing time) | 1–1¼ |
| (3) Breathing and staying at 70–90 p.s.i. | 4¾ |
| Total | 6¾–7 |

By careful comparison of the two methods outlined above it will be seen that through utilization of my methods and apparatus approximately one minutes time can be reduced from the normal press cycle and it is not necessary to maintain high pressures for such prolonged periods. It will be seen that it is not necessary to breathing period. In addition to this advantage the resultant board has highly improved physical characteristics and properties which makes the resulting board much more valuable to the industry. Examples of the physical properties of such boards are outlined below for comparison.

|  | Conventional Method | My Method |
|---|---|---|
| Modulus of Rupture, p.s.i. | 8,000 | 12,000 |
| Density in pounds per cubic foot | 64.0 | 65.5 |
| Water absorbed in 24 hr. period, percent | 18.0 | 12.0 |
| Percentage of swell in thickness over 24 hr. period | 12.5 | 7.5 |
| Internal bond strength in p.s.i. | 220 | 380 |
| Impact resistance in inch pounds | 8.5–10.0 | 12.0–13.0 |

Careful examination of the above columns shows that a board manufactured through the use of my methods and apparatus has highly improved physical properties. It will be noted that the modulus of rupture is increased by fifty percent and that the tendency to absorb water over a twenty-four hour period is reduced to only two-thirds that of a board manufactured under the conventional method. In addition, the internal bond strength has been almost doubled and the impact has been increased by almost fifty percent. The tendency to swell through the absorption of water over a twenty-four hour period has been reduced to only sixty percent of the tendency of a similar board which has been manufactured under conventional methods.

The water content of the wetlap varies in the normal production of hardboard but it is generally between sixty and seventy percent. I have found that when my methods and apparatus are utilized it is possible to utilize much coarser fibers than is possible under the old method. This, of course, substantially reduces the cost of production.

The screen 9 and the plate 10 are carried by the platen 5 and are secured thereto in any conventional manner as through the use of hangers or other means which are well known in the art. Similarly, the plate 14 and the screen 12 are carried by the platen 6. Since the moisture escapes freely through the screen 12 and since the screen is prevented from actual contact with the layer 13 of wetlap, it is no longer necessary when utilizing my method and apparatus to spend time scrubbing and cleaning the screen 12 as is required when conventional methods are utilized. Under conventional methods it is necessary to remove the screen 12 and boil it in soda ash solution and thereafter rinse the same in order to adequately clean it for subsequent operation. Such maintenance has been reduced to an absolute minimum through the use of the stainless steel plate 14 which prevents the wood pulp from coming in contact with the screen 12. The screen 12 serves a dual function of distributing the heat uniformly through the plate 14 and greatly facilitating the passage of the steam which is generated in the layer 13 laterally to the exterior so that the drainage of the layer 13 is uniform throughout its entire area.

The columns of figures outlined above shows that a hardboard manufactured through the use of my methods and apparatus has substantially increased elasticity and has much greater resistance to moisture and swelling. In addition, it has greatly increased internal bond strength and hence is much more valuable to the trade for there is a constant search for thinner and more durable hardboard, particularly in the automobile industry in which large quantities of such hardboard are utilized.

When a piece of hardboard is manufactured through the use of my methods and apparatus, one side of the board will be completely smooth while the other side will have a plurality of relatively widely spaced small projections which may be readily sanded off by micro-sanding. This operation is relatively inexpensive and can be accomplished very quickly to provide a highly desirable board without any appreciable reduction in its strength or other physical properties.

In addition to the advantages outlined above, I have found that it is possible to utilize plates 14 having apertures which create beautiful designs on the one surface of the resultant hardboard without the consequent reduction in physical properties being so great as to prohibit their usage. It will be readily appreciated, of course, that if the openings are relatively large the strength of the board will be somewhat diminished but nevertheless the strength of the board will still be substantially greater than that produced by conventional methods wherein only a screen is utilized at one side of the wetlap to produce the board. When a board having such a design is produced, some very beautiful effects can be created by applying paint of one color to the more depressed portions and paint of another color to the outer surface of the slight projections or protrusions which are formed on the board in the areas defined by the apertures 15.

In order to obtain the maximum benefits of my invention it is desirable to have separate plates 14 for different thicknesses of boards. In such instances, the plate utilized to manufacture the thinner board will have the greatest center to center distances of the apertures 15 while the thicker boards would have shorter center to center distances and/or greater diameter of the apertures.

It will be readily appreciated, of course, that the underside of the plate 14 could have a plurality of small channels formed therein and communicating between the central and peripheral portions thereof. Such a plate could be used in lieu of the combination of the plate 14 and the screen 12 as a means of permitting the moisture which passes through the apertures of the plate to escape laterally and thereby provide uniform drainage of the moisture from the layer of wetlap while the platens compress the same. Wherever hereinafter such means is specified it is intended to include a plate so formed or inscribed. It will be appreciated, however, that the cost of forming the plate 14 in this manner would substantially increase the cost of the plate and would exceed the cost of a screen 12 and plate 14 without such channels formed therein.

It will, of course, be understood that various changes may be made in the form, details, arrangement and proportions of the parts without depatring from the scope of this invention which consists of the matter shown and described herein and set forth in the appended claims.

What is claimed is:

1. In apparatus for use in the manufacture of hardboard including a pair of vertically spaced opposed oppositely facing platens having generally horizontal faces and being movable toward and away from each other, means connected to said platens for heating the same to desired temperatures, means for forcing said platens toward each other to compress a layer of wet pulp when the latter is placed therebetween, a flat perforated plate carried by one of said platens in generally horizontal position to engage such a layer in compressing relation, the improvement wherein said plate has a plurality of perforations extending therethrough of a suitable number and size and arrangement to controllably restrict uniformly across the layer the drainage of water therefrom through said plate when the layer is so compressed between said platens.

2. In apparatus for use in the manufacture of hardboard including a pair of vertically spaced opposed oppositely facing platens having generally horizontal faces and bieng movable toward and away from each other, means connected to said platens for heating the same to desired temperatures, means for forcing said platens toward each other to compress a layer of wet pulp when the latter is placed therebetween, a flat perforated plate carried by one of said platens in generally horizontal position to engage such a layer in compressing relation, the improvement wherein said plate has a plurality of perforations extending therethrough of a suitable number and size and arrangement to controllably restrict uniformly across the layer the drainage of water therefrom through said plate when the layer is so compressed between said platens, and drainage permitting means between said perforated plate and its said associated platen whereby the moisture passing through said perforations in the plate may readily escape.

3. In apparatus for use in the manufacture of hardboard including a pair of vertically spaced opposed oppositely facing platens having generally horizontal faces and being movable toward and away from each other, means connected to said platens for heating the same to desired temperatures, means for forcing said platens toward each other to compress a layer of wet pulp when the latter is placed therebetween, a flat perforated plate carried by one of said platens in generally horizontally position to engage such a layer in compressing relation, the improvement wherein said plate has a plurality of perforations extending therethrough of a suitable number and size and arrangement to controllably restrict uniformly across the layer the drainage of water therefrom through said plate when the layer is so compressed between said platens, the combined area of said perforations being within the range of about 4% to about 17% of the total area of said plate, and drainage permitting means between said perforated plate and its said associated platen whereby the moisture passing through said perforations in the plate may readily escape.

4. The method of manufacturing hardboard consisting in compressing a layer of wet pulp while simultaneously applying heat thereto, and inserting a perforated plate having a suitable number and size and arrangement of perforations therein against the layer of wet pulp prior to compressing and heating the same for controllably restricting uniformly across the layer the drainage of water therefrom, thus providing a board of uniform density and strength throughout the entire area thereof.

5. The method of manufacturing hardboard consisting in compressing a layer of wet pulp while simultaneously applying heat thereto, and prior thereto inserting a perforated plate having a suitable number and size and arrangement of perforations therein of a combined area within the range of about 4% to to about 17% of the total area of the plate against the layer of wet pulp for controllably restricting uniformly across the layer the drainage of water therefrom while the layer is so compressed and heated, thus providing a board of uniform density and strength throughout the entire area thereof.

References Cited in the file of this patent

UNITED STATES PATENTS

| | | |
|---|---|---|
| 784,183 | Schaffer | Mar. 7, 1905 |
| 1,812,970 | Mason | July 7, 1931 |
| 1,826,729 | Carver | Oct. 13, 1931 |
| 1,844,861 | Mason | Feb. 9, 1932 |
| 1,894,777 | Mason | Jan. 17, 1933 |
| 1,933,934 | Ruby | Nov. 7, 1933 |

FOREIGN PATENTS

| | | |
|---|---|---|
| 859,690 | Great Britain | Jan. 25, 1961 |